US012464587B2

United States Patent
Rajput et al.

(10) Patent No.: US 12,464,587 B2
(45) Date of Patent: Nov. 4, 2025

(54) ENDC CONNECTIVITY WITH VIRTUALIZED eNBs

(71) Applicant: Parallel Wireless, Inc., Nashua, NH (US)

(72) Inventors: Mahendra Singh Rajput, Bangalore (IN); Anoop Gupta, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 356 days.

(21) Appl. No.: 17/880,644

(22) Filed: Aug. 3, 2022

(65) Prior Publication Data

US 2023/0043184 A1 Feb. 9, 2023

Related U.S. Application Data

(60) Provisional application No. 63/228,833, filed on Aug. 3, 2021.

(51) Int. Cl.
| | | |
|---|---|---|
| *H04W 76/00* | (2018.01) | |
| *H04W 76/12* | (2018.01) | |
| *H04W 76/16* | (2018.01) | |
| *H04W 92/04* | (2009.01) | |
| *H04W 92/20* | (2009.01) | |

(52) U.S. Cl.
CPC ......... *H04W 76/16* (2018.02); *H04W 76/12* (2018.02); *H04W 92/045* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2014/0233521 A1* | 8/2014 | Nylander | H04W 16/18 370/329 |
| 2019/0174449 A1* | 6/2019 | Shan | H04W 60/04 |
| 2022/0116854 A1* | 4/2022 | Vidyashankar | H04M 15/66 |

FOREIGN PATENT DOCUMENTS

| | | | | |
|---|---|---|---|---|
| WO | WO-2014169687 A1 * | 10/2014 | ............ | H04W 76/12 |
| WO | WO-2015043289 A1 * | 4/2015 | ............ | H04W 24/02 |
| WO | WO-2015043292 A1 * | 4/2015 | ............ | H04W 40/24 |

OTHER PUBLICATIONS

LTE; Evolved Universal Terrestrial Radio Access (E-UTRA) and Evolved Universal Terrestrial Radio Access Network (E-UTRAN); Overall description; Stage 2 (3GPP TS 36.300 version 15.5.0 Release 15), May 2019.

* cited by examiner

*Primary Examiner* — Gerald A Smarth
(74) *Attorney, Agent, or Firm* — Michael Y. Saji

(57) ABSTRACT

A method for establishing indirect and/or dual connectivity between virtualized 5G gENBs and virtualized 4G eNodeBs for dynamic X2 is disclosed. In one embodiment a method includes virtualizing, with a HetNet Gateway (HNG), BBUs and home eNodeBs over a standard S1 interface; establishing the HNG as a macro interfacing an EPC on 3GPP standard interfaces; communicating with an MME over the S1 interface for control plane signaling; and communicating with SAEGW over a standard GTPU interface for a data plane.

18 Claims, 9 Drawing Sheets

ENDC CONNECTIVITY WITH VIRTUALIZED eNBs

CROSS-REFERENCE TO RELATED APPLICATIONS

This application claims priority under 35 U.S.C. § 119(e) to U.S. Provisional Pat. App. No. 63/228,833, filed Aug. 3, 2021, titled "ENDC Connectivity with Virtualized eNBs" which is hereby incorporated by reference in its entirety for all purposes. This application also hereby incorporates by reference, for all purposes, U.S. patent application Ser. No. 17/878,853, filed Aug. 1, 2021, and titled "Optimized S1-X2 Handovers." This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014; U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

In the LTE radio access technology, as defined by the Third Generation Partnership Project (3GPP), an S1 interface is used between a base station (an eNodeB) and the core network to perform user equipment (UE) handovers, and, an X2 interface is used between an eNodeB and other peer eNodeBs to communicate relevant information. It is possible in the prior art to perform handovers between eNodeBs that utilize the X2 interface to speed up handover, instead of using the S1 interface exclusively.

Recently, virtual machines and virtual environments, often using hypervisors, containers or other virtualization technologies, having been developed in the broader technology world, have started to see adoption amongst the telecom industry. These virtual machines operate to provide the functionality previously made available on dedicated hardware, and communicate over the network as if deployed on dedicated hardware, but however are easier to maintain, configure, fail over, etc. as a result of having a narrow scope of definition for the specific services that run on each virtual machine.

Radio networks require the use of compute, called baseband processing, to process radio frequency signals and turn them into digital data. This compute has traditionally been located on-node but in recent days is migrating to the base of the tower, if not further away using the use of high-speed data links and virtual machine technology. Fronthaul networks are the networks that are used to share radio samples to the RF baseband.

Initial deployments of 5G are more likely to be NSA based utilizing the existing 4G network and an providing an overlay of 5G connectivity in some of the areas. Existing 4G core can be used to support NSA with required modifications as per Rel-15 and above.

SUMMARY

A method for establishing indirect and/or dual connectivity between virtualized 5G gENBs and virtualized 4G eNodeBs for dynamic X2 is disclosed. In one embodiment a method includes virtualizing, with a HetNet Gateway (HNG), BBUs and home eNodeBs over a standard S1 interface; establishing the HNG as a macro interfacing an EPC on 3GPP standard interfaces; communicating with an MME over the S1 interface for control plane signaling; and communicating with SAEGW over a standard GTPU interface for a data plane.

DETAILED DESCRIPTION

In some cases it is possible to have static connectivity between 4G MENB with unique global ENB IDs and 5G SENB with unique global GNB Id. With virtualized ENB solution, this surfaces a limitation when multiple ENBs are sharing the same global eNB IDs.

As per 3GPP TS 36.300, which is hereby incorporated by reference, the 5G NR Identifiers as defined as: NR Cell Global Identifier (NCGI): used to identify NR cells globally. The NCGI is constructed from the PLMN identity the cell belongs to and the NR Cell Identity (NCI) of the cell. gNB Identifier (gNB ID): used to identify gNBs within a PLMN. The gNB ID is contained within the NCI of its cells. Global gNB ID: used to identify gNBs globally. The Global gNB ID is constructed from the PLMN identity the gNB belongs to and the gNB ID. The MCC and MNC are the same as included in the NCGI. Tracking Area identity (TAI): used to identify tracking areas. The TAI is constructed from the PLMN identity the tracking area belongs to and the TAC (Tracking Area Code) of the Tracking Area.

X2GW module in HNG interworks with SON module to provide interface for/towards SON module to update the information required for X2 association management. On receiving cell information from CWS, SON updates the X2GW with additional parameters required for creating/updating X2 association. When SON receives UE measurement report from CWS, it updates the same to X2GW with neighbor information to take further action.

Figure 1:
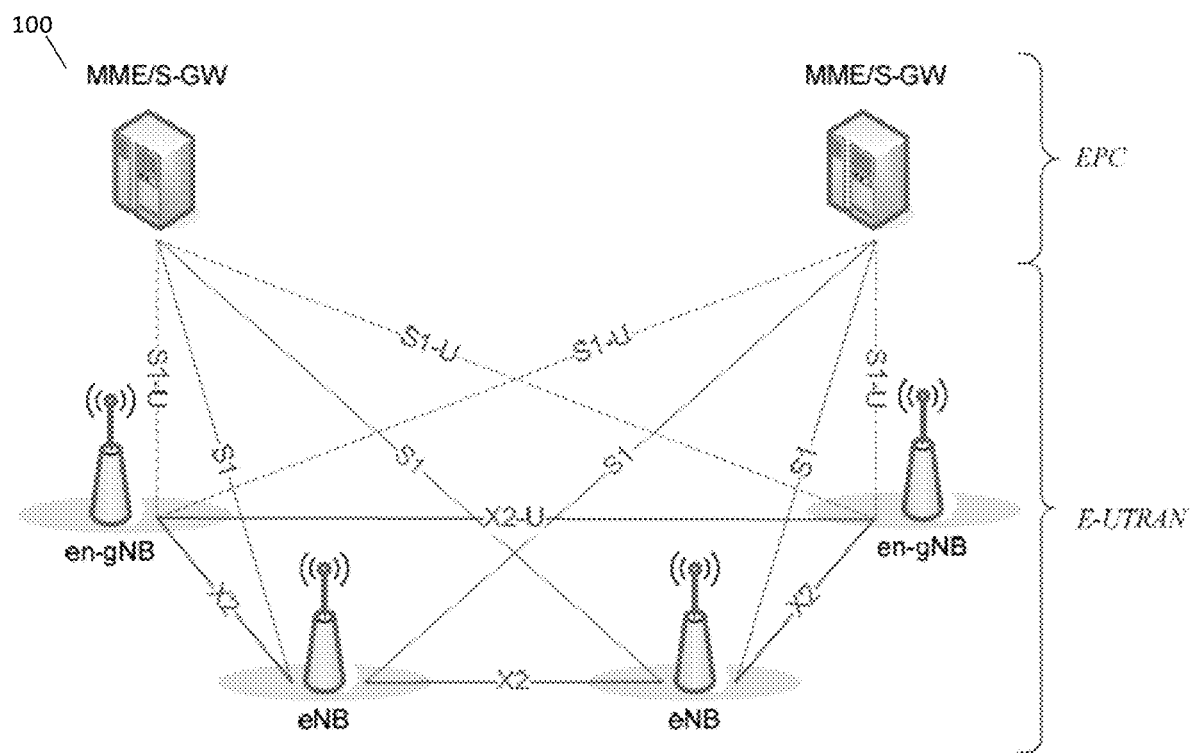
FIG. 1 is a diagram of an NSA architecture, in accordance with the prior art.

FIG. 1 shows a 5G NSA (Non-Standalone) architecture 100 in accordance with the prior art, based on the concept that extends the 'Dual Connectivity' between nodes. The nodes are categorized into: Master ENodeB (MeNB)—Anchor point for control signaling. S1 association for the UE is anchored from MeNB to the core network. Secondary ENodeB (SeNB)—Additional ENB where UE can do Rx/Tx for a given set of radio bearers. A UE can have connection to maximum 1 SeNB in addition to MeNB at any given instance.

Figure 2:
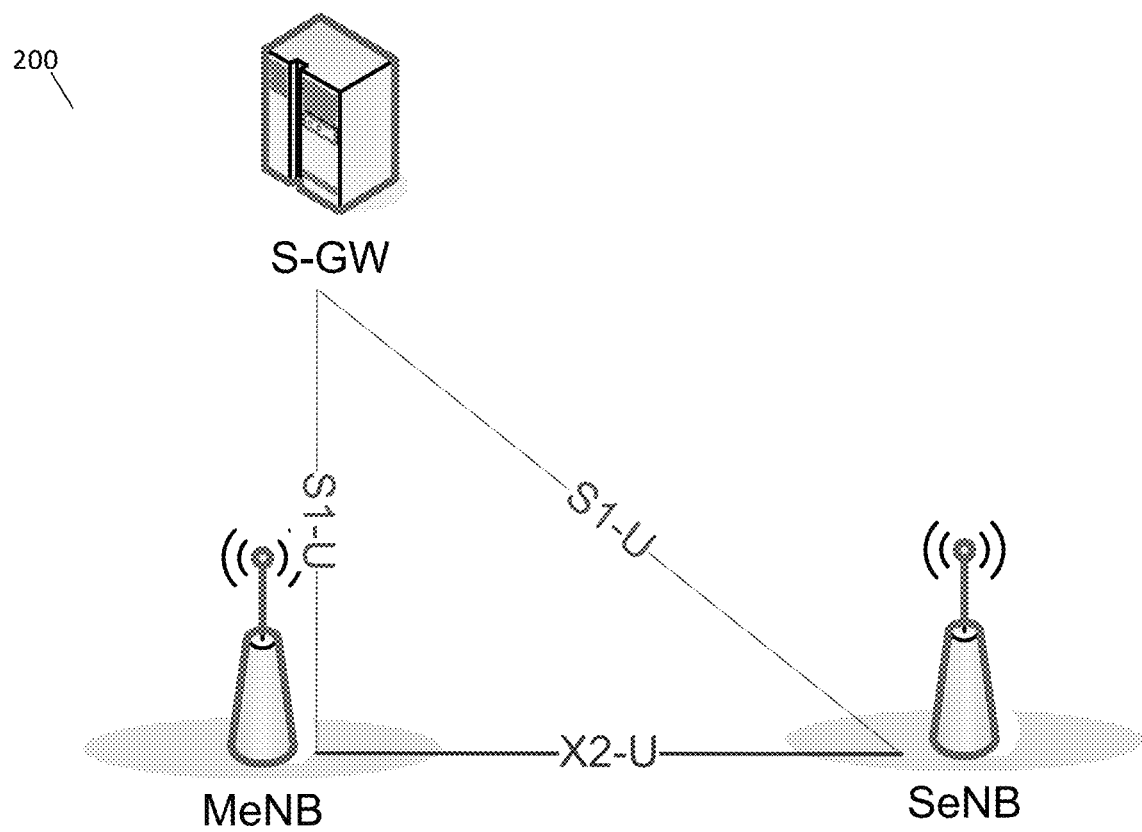
FIG. 2 is a diagram of a control plane, in accordance with the prior art.

FIG. 2 shows a diagram of control plane communications 200 in accordance with the prior art. UE (not shown) is connected to both MeNB and SeNB. An X2-U (user plane) connection exists between the MeNB and SeNB. An LTE EPC S-GW in the core is connected to both MeNB and SeNB via an S1-U connection to each of MeNB and SeNB.

Figure 3:
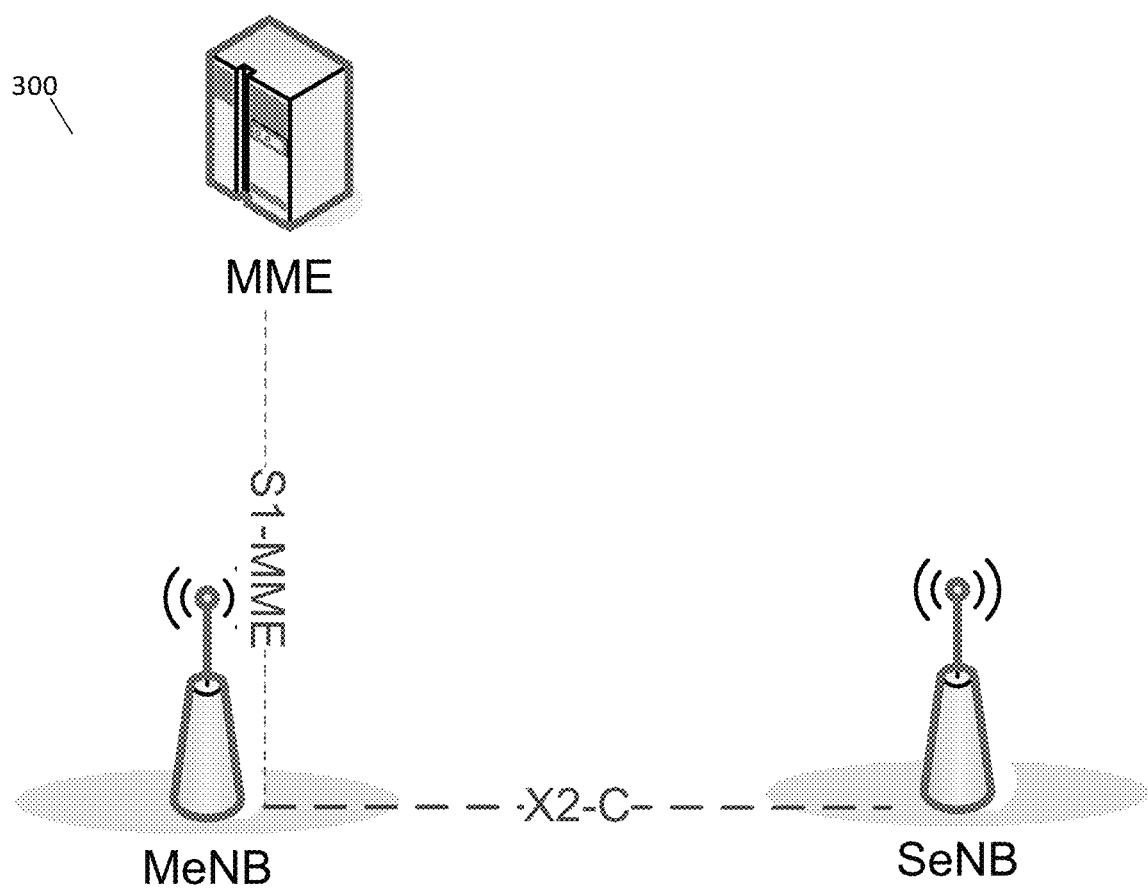
FIG. 3 is a diagram of a data plane, in accordance with the prior art.

FIG. 3 is a diagram showing data plane communications 300 in accordance with the prior art. UE (not shown) is connected to both MeNB and SeNB. An X2-C (control plane) connection exists between the MeNB and SeNB. An LTE EPC MME in the core is connected to the MeNB via an S1-MME connection, and the X2-C connection is used for passing control plane communications to SeNB, including from the MME. EN-DC: When the MeNB is a LTE ENodeB and the SeNB is an En-GNB. (where "En-gNB: node providing NR user plane and control plane protocol terminations towards the UE, and acting as Secondary Node in EN-DC").

Figure 4:
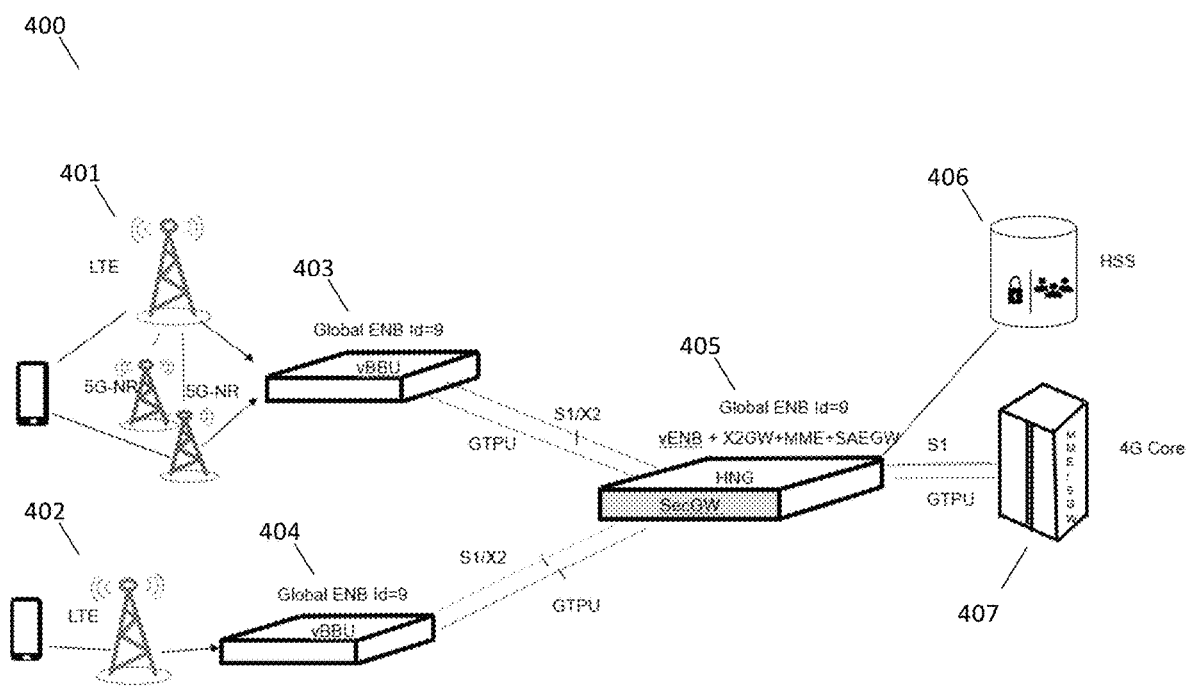
FIG. 4 is a diagram showing HNG internode communication, in accordance with some embodiments.

FIG. 4 shows a solution 400 with an intervening gateway 405, marked HNG herein, in accordance with some embodiments. Where a node is identified as HNG herein, it is understood that a gateway that is situated between the RAN and the core network that handles at least the specific functions of a particular embodiment is meant by using the term "HNG," and that the HNG is not limited to any Parallel Wireless products past or present. In some embodiments, base stations such as LTE eNodeBs (401, 402 as shown) are virtualized providing single interface to EPC core at 405 as one solution as well as hosting EPC core along with virtualized eNodeB solution. A back to back proxy or stateful proxy could be used by 405. Cell ID could be used to disambiguate the eNodeBs.

HNG 405 virtualizes the PW vBBUs as well as third party Home eNodeBs over standard S1 interface and establishes itself as a Macro interfacing the EPC on 3GPP standard interfaces. HNG communicates to MME 407 over S1 interface for control plane signaling. For Data plane, HNG communicates with SAEGW over standard GTPU interface. vENB, X2GW, MME, SAEGW may be provided at 405. For private LTE network solution, HNG establishes itself as Edge core solution with veNB, MME+SAEGW running together by PW. HSS 406 is also in direct communication with HNG 405.

For ENDC connectivity HNG provides standard S1-X2 interface with eNodeBs hosted as part of vBBU solution and standard X2 interface with 5G global eNodeBs via indirect X2, as shown. ENDC is managed using data structures stored at 405 such that S1-MME and S1-U connections are terminated at HNG 405. Information regarding ENDC may be passed on to the core, in some embodiments, or not passed on, in other embodiments.

Figure 5:
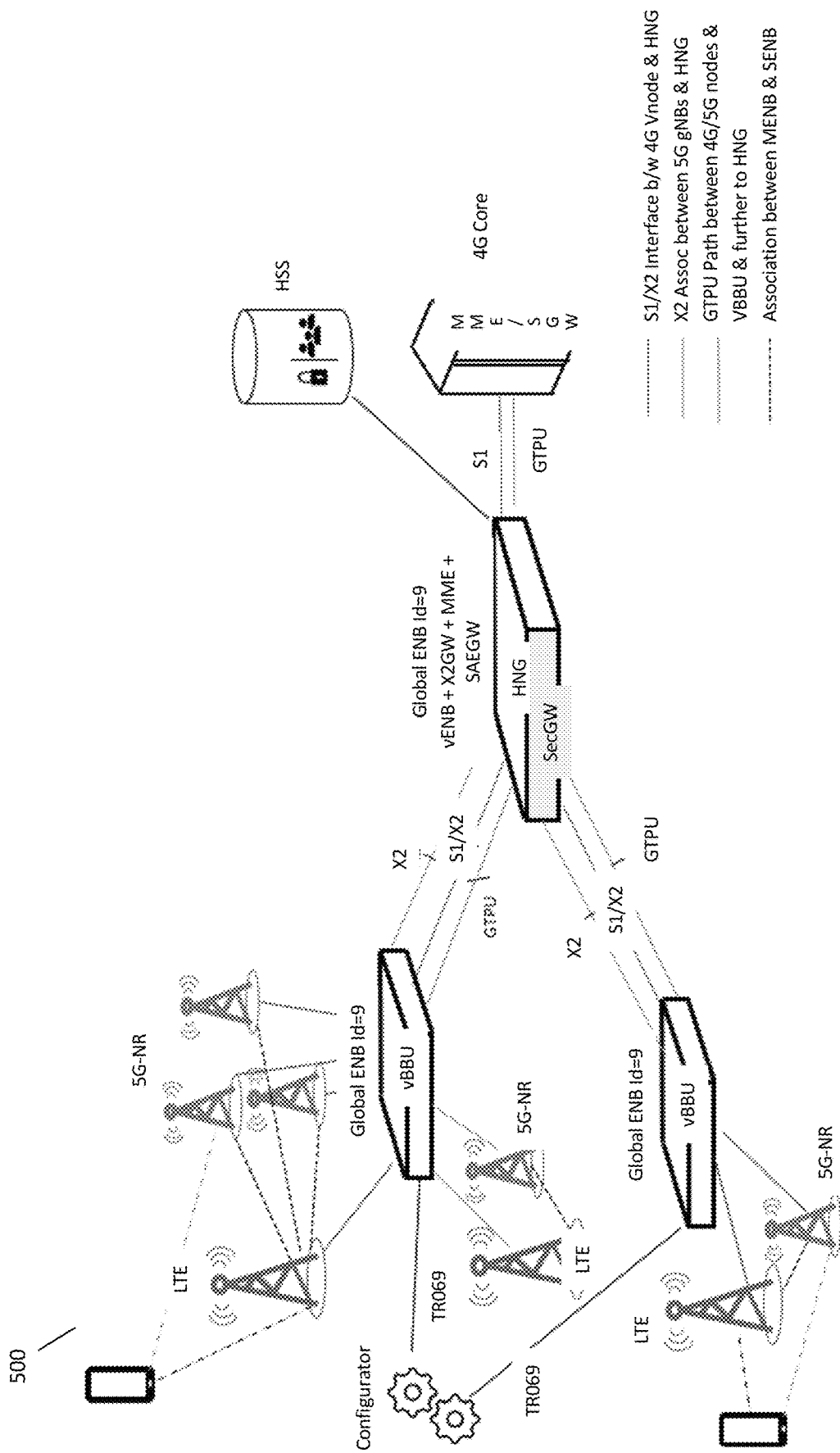
FIG. 5 is a diagram showing an HNG having reduced connection overhead, in accordance with some embodiments.

FIG. 5 shows the Virtualization of eNBs (MeNB) and gENBs (SeNB) 500, in accordance with some embodiments. HNG shall maintain the relation between SeNBs and MeNB when TNL association (transport network layer association, e.g., a handoff or attach) is attempted from MeNB in context of a SeNB.

Role of HNG as X2GW. X2GW reduces the amount of connection overhead by simplifying the mesh topology into star topology. Each GeNB can connect to X2GW. No need for ENBs and GeNBs to maintain multiple X2 associations required for EN-DC. HNG X2GW will keep GeNBs and ENBs informed about each other. HNG X2GW will route the bearer addition/modification/deletion requests towards GNBs. S1/X2 Interface b/w 4G Vnode and HNG, X2 assoc between 5G ENBS and HNG, GTPU Path between 4G/5G nodes and VBBU and further to HNG, and associations between MENB and SENB are shown.

Figure 6:
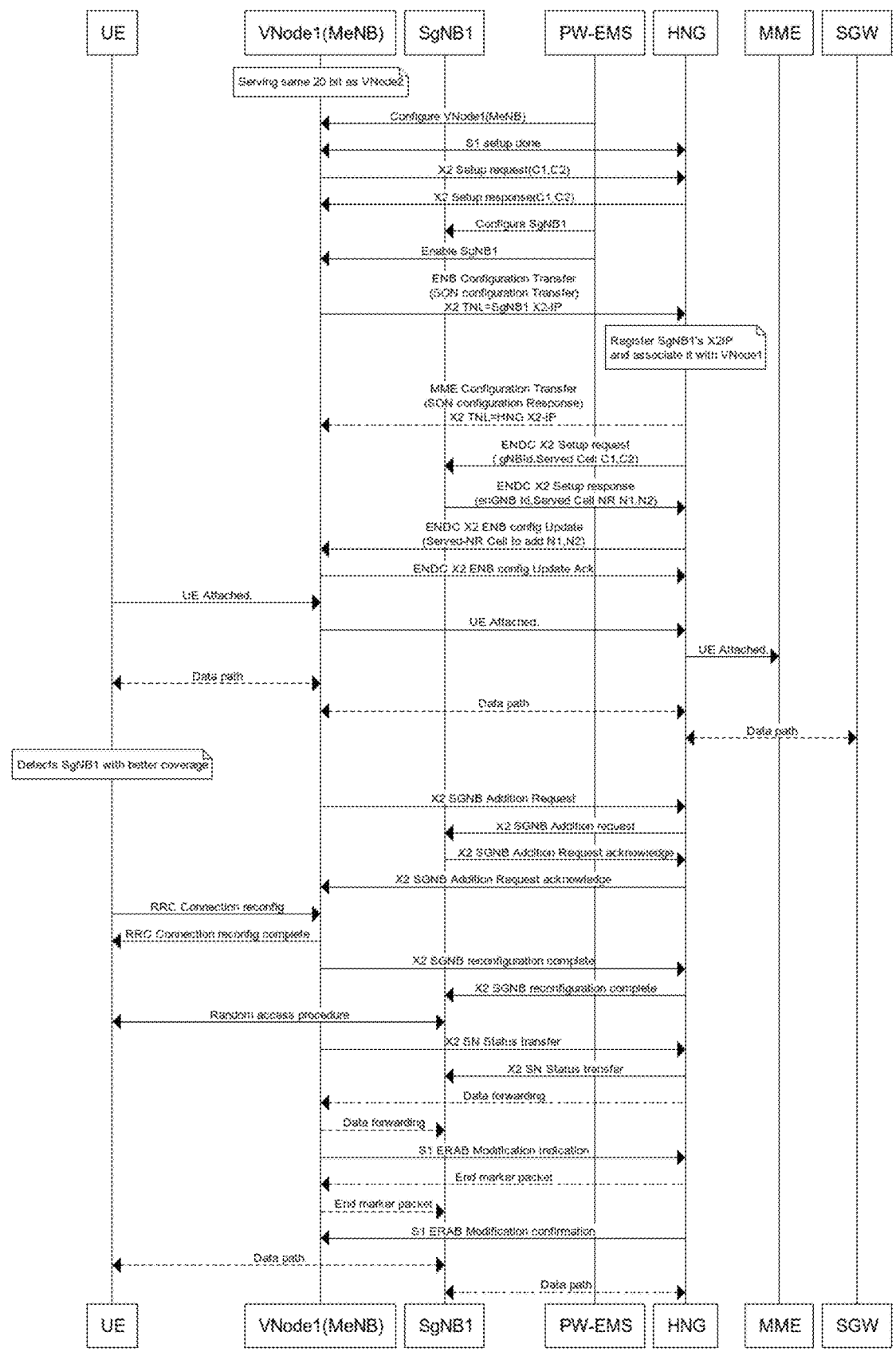
FIG. 6 is a diagram of a call flow for communications between 5G GeNBs and ENBs, in accordance with some embodiments.

FIG. 6 is an exemplary call flow to communicate 5G GeNBs with ENBs for ENDC solution, in accordance with some embodiments. PW-EMS is an PW configuration server responsible to configure and control PW eNodeBs (VNodes as part of PWs Virtual BBU Solution), PW 5G GeNBs etc. PW 5G GeNB shall be incubated as a VNode as part of Virtual BBU. PW-EMS configures the VNode1 and VNode1 registers itself over S1 interface via S1-Setup request with common global EnodeB Id. After S1 interface is brought up, VNode1 is informed with SgNB1's X2IP by HNG 405.

HNG establishes S1/X2 connectivity with eNodeBs (VNode1) all of which are serving same 20 bit standard eNodeB Id. The 5G GeNB shall act as a SgNB1 or SENB or Secondary ENodeB in ENDC architecture below. 4G eNodeB is responsible for anchoring the UE over S1 interface.

4G eNodeB starts establishing X2 Link towards X2GW module of HNG by sending Standard ENB Configuration Transfer message instructing TNL source IP in SON configuration request. HNG allocates the IP to communicate to eNodeB on X2 interface and respond to 4G eNodeB by embedding IP in SON information reply as part of MME Configuration transfer message. eNodeB initiates the SCTP connection towards HNG and establishes X2 with HNG.

PW-EMS configures gENB with standard eNB ID. The 5G Identifiers used for gENB are defined in the later section of this document.

PW-EMS send control request to activate the gENB towards 4G eNodeB (Master eNodeB or MeNB) with geNBs X2-IP and other relevant parameters of gENB. MeNB sends ENB Configuration Transfer with SON Configuration request stating gENB X2 IP address. HNG registers gENB X2 IP address and associate itself with MeNB from where the TNL request has come. HNG allocates the IP from the X2 pool of IPs and respond back to MeNB using MME Configuration Transfer message with SON reply.

HNG also initiates ENDC X2 Setup request(Served Cell=MeNB Served Cells) with GeNB with the IP received from SON configuration request. GeNB records with MeNB Served Cells and responds with ENDC X2 Setup response with Served NCGI. HNG registers the NCGI as SENB served cells connected with MeNB.

HNG Updates the MeNB with NCGI as being served by HNG on behalf of SeNB.

UE Attaches to MeNB and establishes the bearers. UE finds NCGIs with better radio coverage and informs MeNB through measurement report.

MeNB identifies NCGIs are with HNG (received via ENB config update earlier) sends X2 SGNB Addition request to HNG. HNG forwards X2 SGNB addition request to SeNB as these NCGIs are registered as being served by SeNB. SeNB updates the UL Teld received and establishes UL data path for Data transfer between MeNB and SeNB.

SeNB sends X2 SGNB Addition request acknowledge to HNG which HNG forwards to MeNB. HNG records S1 DL GTP Tunnel Endpoint at the SeNB and further use it to send DL packets.

MeNB sends X2 SGNB Reconfiguration complete to HNG which HNG route it to SeNB.

MeNB sends X2 SN Status transfer to inform the sequence number to HNG which HNG forwards to SENB.

MeNB sends S1-ERAB Modification indication to HNG for update on DL GTPU tunnel ID. HNG updates the DL GTPU tunnel ID and start forwarding the DL packets to SeNB once END marker is reached on X2 Data path.

As per 3GPP TS 36.300, the 5G NR Identifiers as defined as: NR Cell Global Identifier (NCGI): used to identify NR cells globally. The NCGI is constructed from the PLMN identity the cell belongs to and the NR Cell Identity (NCI) of the cell.

It should be appreciated that the present disclosure could be implemented with a virtual base station of any type, whether using containers, hypervisors, virtual machines, or another virtualization technology, and with virtual base stations supporting various RATs, specifically including 2G, 3G, 4G, 5G. Virtualization could virtualize any function in the network, but specifically including baseband; and any named network function such as SAEGW, MME, or X2GW.

Figure 7:
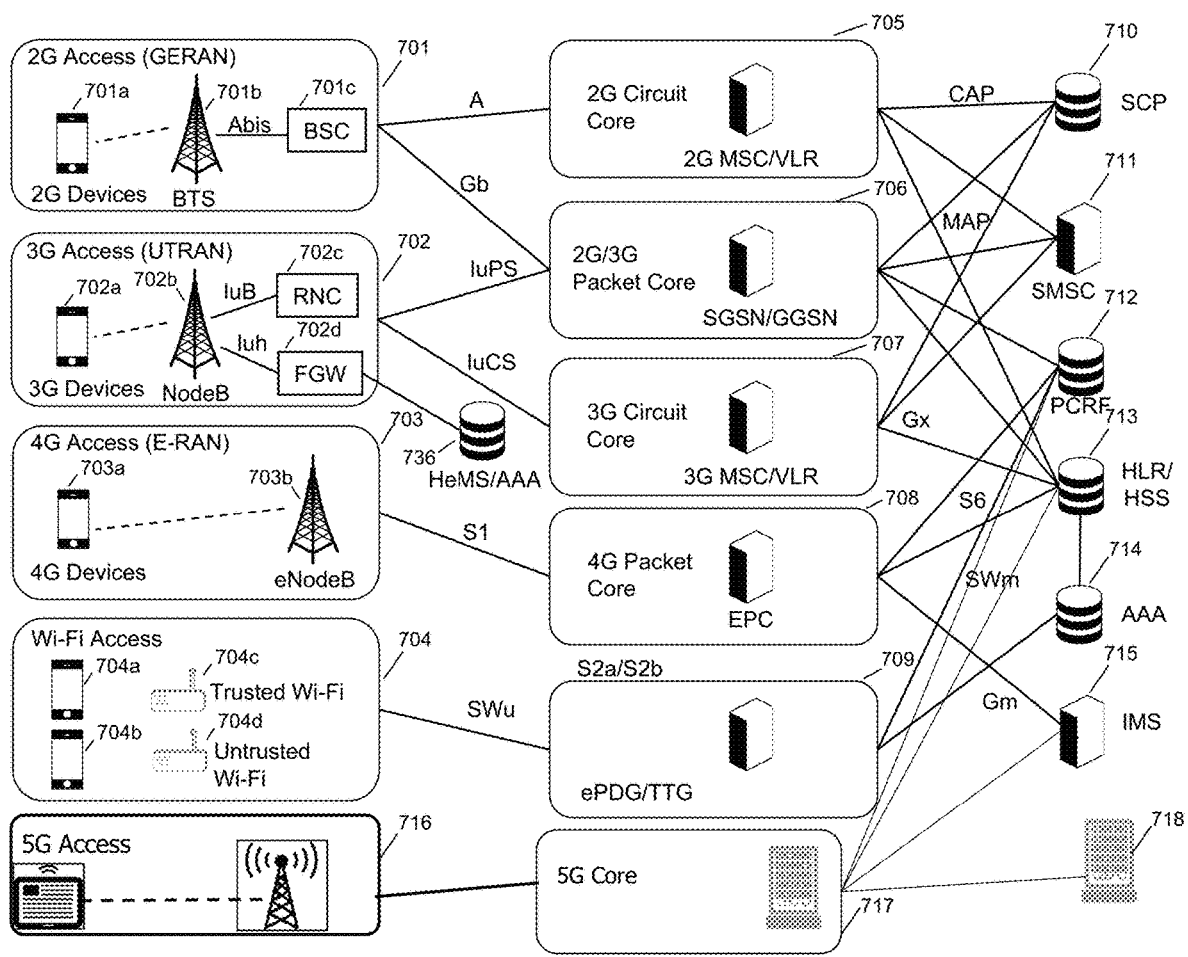
FIG. 7 is a schematic network architecture diagram for 3G and other-G prior art networks.

FIG. 7 shows a schematic network architecture diagram for 3G and other-G networks, in accordance with some embodiments. The diagram shows a plurality of "Gs," including 2G, 3G, 4G, 5G and Wi-Fi. 2G is represented by GERAN 701, which includes a 2G device 701*a*, BTS 701*b*, and BSC 701*c*. 3G is represented by UTRAN 702, which includes a 3G UE 702*a*, nodeB 702*b*, RNC 702*c*, and femto gateway (FGW, which in 3GPP namespace is also known as a Home nodeB Gateway or HNBGW) 702*d*. 4G is represented by EUTRAN or E-RAN 703, which includes an LTE UE 703*a* and LTE eNodeB 703*b*. Wi-Fi is represented by Wi-Fi access network 704, which includes a trusted Wi-Fi access point 704*c* and an untrusted Wi-Fi access point 704*d*. The Wi-Fi devices 704*a* and 704*b* may access either AP 704*c* or 704*d*. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701*c* is required for Abis compatibility with BTS 701*b*, while for the 3G UTRAN, an RNC 702*c* is required for Iub compatibility and an FGW 702*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
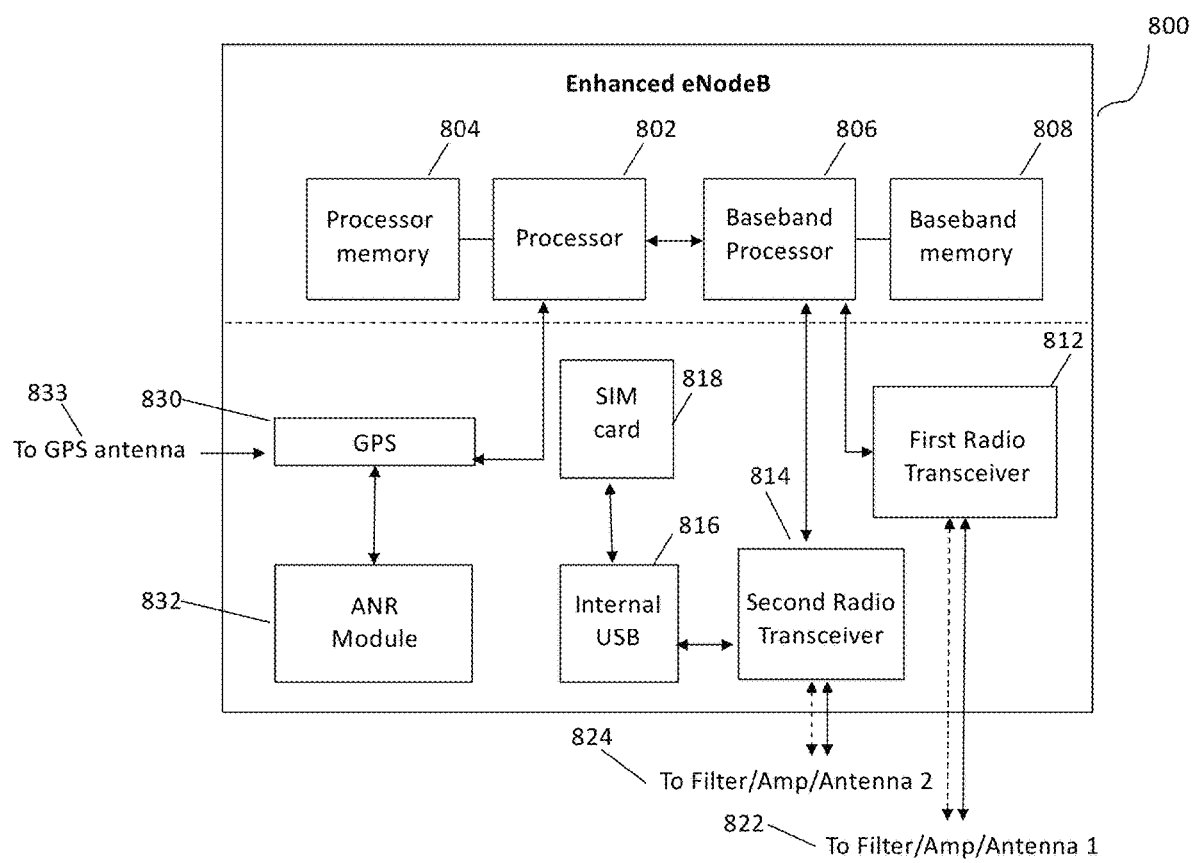
FIG. 8 is an enhanced eNodeB for performing the methods described herein, in accordance with some embodiments.

FIG. 8 shows an enhanced eNodeB for performing the methods described herein, in accordance with some embodiments. Where an eNodeB is shown herein, a gNodeB or other RAT base station may also be understood to be disclosed, with Xx/Xn being used in place of X2 for gNB, etc. eNodeB 800 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates and/or timing information, which is used for synchronizing the eNodeB with the network in some embodiments. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers, radio arrays, radio filters or other components, and/or wired network connections may also be included.

Figure 9:
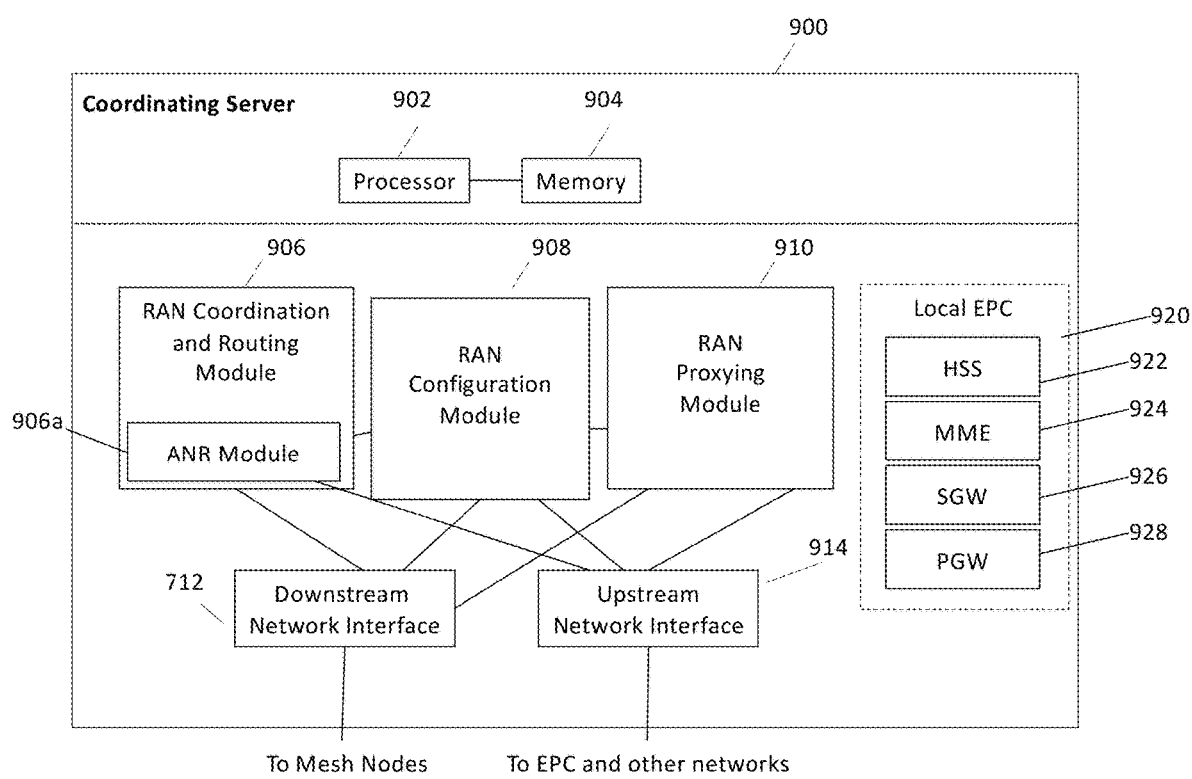
FIG. 9 is a coordinating server for providing services and performing methods as described herein, in accordance with some embodiments.

FIG. 9 shows a coordinating server for providing services and performing methods as described herein, in accordance with some embodiments. Coordinating server 900 includes processor 902 and memory 904, which are configured to provide the functions described herein. Also present are radio access network coordination/routing (RAN Coordination and routing) module 906, including ANR module 906*a*, RAN configuration module 908, and RAN proxying module 910. The ANR module 906*a* may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906,

908, 910 and local EPC 920 may each run on processor 902 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary. For example, where dual connectivity is disclosed, multiple connectivity for more than two base stations could also be provided. For example, although a 4G-5G DC architecture and embodiment are disclosed, any multi-RAT system could be enabled to be provided using the same architecture but with appropriate protocols for those particular radio access technologies.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for establishing indirect connectivity between virtualized 5G gNodeBs and virtualized 4G eNodeBs, the method comprising:
    virtualizing, at a gateway situated between a radio access network (RAN) and a 4G Long Term Evolution (LTE) core network, an eNodeB over a standard S1 interface toward the 4G LTE core network;
    receiving, at the gateway, an X2 setup request sent from a primary X2 node;
    registering, at the gateway, an Internet Protocol (IP) address for a secondary X2 node in association with the primary X2 node, the IP address for the secondary X2 node received from the primary X2 node; and
    subsequently establishing a data path for data transfer from the gateway to the secondary X2 node to facilitate handover of a UE from the primary X2 node to the secondary X2 node.

2. The method of claim 1, wherein the gateway comprises two or more of a virtual eNodeB, an X2 interface gateway service, a mobility management entity (MME), a SAE gateway (SAEGW), and a security gateway.

3. The method of claim 1, wherein the primary X2 node is an LTE eNodeB and wherein the secondary X2 node is a 5G gNB.

4. The method of claim 1, wherein the 4G eNodeB is responsible for anchoring the UE over an S1 interface.

5. The method of claim 1, further comprising providing core network access for at least one 5G gNodeB in a non-standalone (NSA) mode.

6. The method of claim 1, further comprising providing 5G new radio (NR) service by the secondary X2 node, the secondary X2 node being a 5G gNB.

7. A gateway for establishing indirect connectivity between virtualized 5G gENBs and virtualized 4G eNodeBs, comprising:
    a gateway situated between a radio access network (RAN) and a 4G Long Term Evolution (LTE) core network, the gateway providing virtualization of an eNodeB over a standard S1 interface toward the 4G LTE core network, wherein the gateway is further configured to:
        receive an X2 setup request sent from a primary X2 node containing an Internet Protocol (IP) address for a secondary X2 node,
        register the IP address for the secondary X2 node in association with the primary X2 node; and
        establish, subsequently, a data path for data transfer from the gateway to the secondary X2 node to facilitate handover of a UE from the primary X2 node to the secondary X2 node.

8. The gateway of claim 7, the gateway further comprising two or more of a virtual eNodeB, an X2 interface gateway service, a mobility management entity (MME), a SAE gateway (SAEGW), and a security gateway.

9. The gateway of claim 7, wherein the primary X2 node is an LTE eNodeB and wherein the secondary X2 node is a 5G gNB.

10. The gateway of claim 7, wherein the 4G eNodeB is configured to anchor the UE over an S1 interface.

11. The gateway of claim 7, wherein the gateway provides core network access for at least one 5G gNodeB in a non-standalone (NSA) mode.

12. The gateway of claim 7, wherein the secondary X2 node is a 5G gNodeB and wherein the secondary X2 node is configured to provide 5G new radio (NR) service.

13. A non-transitory computer-readable medium which, when executed at a gateway in a telecommunications system, causes the gateway to perform steps comprising:
    virtualizing an eNodeB over a standard S1 interface toward a 4G Long Term Evolution (LTE) core network;
    receiving, at the gateway, an X2 setup request sent from a primary X2 node;
    registering, at the gateway, an Internet Protocol (IP) address for a secondary X2 node in association with the primary X2 node, the IP address for the secondary X2 node received from the primary X2 node; and
    subsequently establishing a data path for data transfer from the gateway to the secondary X2 node to facilitate handover of a UE from the primary X2 node to the secondary X2 node.

14. The non-transitory computer-readable medium of claim 13, wherein the gateway comprises two or more of a virtual eNodeB, an X2 interface gateway service, a mobility management entity (MME), a SAE gateway (SAEGW), and a security gateway.

15. The non-transitory computer-readable medium of claim 13, wherein the primary X2 node is an LTE eNodeB and wherein the secondary X2 node is a 5G gNodeB.

16. The non-transitory computer-readable medium of claim 13, wherein the 4G eNodeB is responsible for anchoring the UE over an S1 interface.

17. The non-transitory computer-readable medium of claim 13, the steps further comprising providing core network access for at least one 5G gNodeB in a non-standalone (NSA) mode.

18. The non-transitory computer-readable medium of claim 13, the steps further comprising providing 5G new radio (NR) service by the secondary X2 node, the secondary X2 node being a 5G gNodeB.

* * * * *